United States Patent
Moshchuk et al.

(10) Patent No.: US 9,573,623 B2
(45) Date of Patent: Feb. 21, 2017

(54) COLLISION AVOIDANCE CONTROL INTEGRATED WITH ELECTRIC POWER STEERING CONTROLLER AND REAR STEER

(71) Applicant: GM Global Technology Operations LLC, Detroit, MI (US)

(72) Inventors: Nikolai K. Moshchuk, Grosse Pointe, MI (US); Shih-Ken Chen, Troy, MI (US); Chad T. Zagorski, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 14/592,432

(22) Filed: Jan. 8, 2015

(65) Prior Publication Data
US 2016/0200360 A1  Jul. 14, 2016

(51) Int. Cl.
*B62D 15/02* (2006.01)
*B62D 6/00* (2006.01)
*B62D 7/15* (2006.01)

(52) U.S. Cl.
CPC ........... *B62D 15/0265* (2013.01); *B62D 6/002* (2013.01); *B62D 7/159* (2013.01)

(58) Field of Classification Search
CPC .... B62D 15/0265; G08G 1/165; G08G 1/166; G08G 1/167; G08G 1/16; G08G 1/164; B60W 10/18; B60W 10/20; B60W 30/09; G01S 13/931; G01S 2013/9342
USPC ................ 701/25, 31.4, 41, 80, 301, 408, 2, 26, 701/400; 703/2; 244/165; 382/154; 707/102
See application file for complete search history.

(56) References Cited

U.S. PATENT DOCUMENTS

| | | | |
|---|---|---|---|
| 6,382,565 B1* | 5/2002 | Fowell | B64G 1/24 244/165 |
| 8,082,102 B2* | 12/2011 | Ravenscroft | G01C 21/005 701/2 |
| 2004/0138796 A1* | 7/2004 | Yao | B62D 5/001 701/41 |
| 2005/0033499 A1* | 2/2005 | Ekmark | B60T 8/172 701/80 |
| 2005/0060069 A1* | 3/2005 | Breed | B60N 2/2863 701/408 |
| 2005/0273297 A1* | 12/2005 | Young | G06F 17/5009 703/2 |
| 2005/0283494 A1* | 12/2005 | Colossi | G06F 17/30592 |
| 2006/0026017 A1* | 2/2006 | Walker | H04L 63/302 701/31.4 |

(Continued)

*Primary Examiner* — Behrang Badii
*Assistant Examiner* — Sanjeev Malhotra
(74) *Attorney, Agent, or Firm* — Cantor Colburn LLP

(57) ABSTRACT

A method of providing automatic collision avoidance in a vehicle with a front wheel electric power steering (EPS) system and rear wheel active rear steering (ARS) system and an automatic collision avoidance system are described. The method includes generating a vehicle math model including the control variables, designing a steering control goal as a criterion to determine the control variables, and implementing a model predictive control to solve the steering control goal and determine the control variables. The method also includes providing the control variables to the EPS system and the ARS system to respectively control a front actuator associated with front wheels and a rear actuator associated with rear wheels.

14 Claims, 4 Drawing Sheets

(56) References Cited

U.S. PATENT DOCUMENTS

| | | | |
|---|---|---|---|
| 2009/0210109 A1* | 8/2009 | Ravenscroft | G01C 21/005 701/26 |
| 2012/0158280 A1* | 6/2012 | Ravenscroft | G01C 21/005 701/400 |
| 2013/0054128 A1* | 2/2013 | Moshchuk | G08G 1/167 701/301 |
| 2013/0202197 A1* | 8/2013 | Reeler | G01S 17/89 382/154 |
| 2013/0218396 A1* | 8/2013 | Moshchuk | B60W 50/08 701/25 |
| 2015/0158528 A1* | 6/2015 | Moshchuk | B62D 15/0265 701/41 |

* cited by examiner

COLLISION AVOIDANCE CONTROL INTEGRATED WITH ELECTRIC POWER STEERING CONTROLLER AND REAR STEER

FIELD OF THE INVENTION

The subject invention relates to collision avoidance control integrated with an electric power steering controller and rear steer.

BACKGROUND

Vehicle systems are increasingly autonomous. Vehicles refer to any mobile platform such as, for example, automobiles, construction equipment, or robots. For example, cruise control systems maintain a driver-selected speed for the vehicle without the driver manually applying the throttle. Adaptive cruise control systems use inputs from radar, camera, or other sensors to not only maintain the driver-selected speed when feasible but also to slow the vehicle based on a slower moving preceding vehicle. Automated parking systems in vehicles control steering to park the vehicle without driver intervention. Vehicle stability systems intervene when a driver performs a severe steering change that may affect vehicle stability. Current systems also include collision avoidance. Object detection that triggers collision avoidance may be accomplished using short or long range radar (or both), cameras with image processing, laser or light detection and ranging (lidar), ultrasound or other known technologies. Generally, sensor fusion (signal processing of outputs from multiple sensors) may be used to decide if a target (obstruction or threat) is real rather than relying on a single sensor. Once the object is detected via one or more sensors, a warning may be provided to the driver or control may be exerted whereby the front wheel steering torque or angle are adjusted to avoid a collision.

SUMMARY OF THE INVENTION

According to an embodiment, a method of providing automatic collision avoidance in a vehicle with a front wheel electric power steering (EPS) system and rear wheel active rear steering (ARS) system includes generating, using a processor, a vehicle math model including the control variables; designing a steering control goal as a criterion to determine the control variables; implementing a model predictive control to solve the steering control goal and determine the control variables; and providing the control variables to the EPS system and the ARS system to respectively control a front actuator associated with front wheels and a rear actuator associated with rear wheels.

According to another embodiment, an automatic collision avoidance system in a vehicle with a front wheel electric power steering (EPS) system and active rear steering (ARS) system including a memory device configured to store parameters corresponding with types of front and rear actuators; and a processor configured to generate a vehicle math model including control variables, design a steering control goal as a criterion to determine the control variables, implement a model predictive control to solve the steering control goal and determine the control variables, and provide the control variables to the EPS system and the ARS system to respectively control a front actuator associated with front wheels and a rear actuator associated with rear wheels. The processor selects tuning parameters among the stored parameters in the memory device corresponding with the front actuator and the rear actuator of the vehicle to design and to solve the steering control goal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
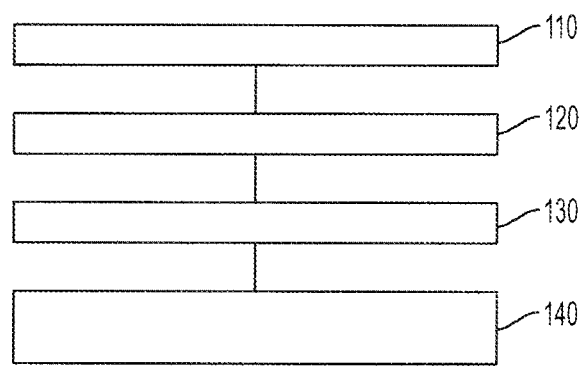
FIG. 1 is a process flow of a method of performing collision avoidance according to an embodiment of the invention.

The following description is merely exemplary in nature and is not intended to limit the present disclosure, its application or uses. It should be understood that throughout the drawings, corresponding reference numerals indicate like or corresponding parts and features.

As noted above, vehicle automation systems are increasingly available and increasingly sophisticated in their functionality. While automobile systems are discussed herein for explanatory purposes, vehicles are not intended to be limited to automobiles and refer to any moving platform such as construction equipment or robots, for example. The current automotive collision avoidance system provides driver assistance to avoid or mitigate the severity of collisions by providing pre-collision preparation, warnings, and, if needed, braking or steering automatically or via enhanced actions of the driver. Currently, the automatic steering controls torque and angle of the front wheel only. Using this approach, the current collision avoidance system may contribute too much torque to the system when the driver of the vehicle (e.g., automobile) performs a second maneuver (possibly at high speed and possibly to try to correct from an initial over-steer maneuver), for example. This combination of actions may result in torque building up too fast and the driver feeling the intervention system. Embodiments of the systems and methods described herein relate to a collision avoidance system that includes a combination of front wheel and rear wheel steering control that facilitates the collision avoidance without the driver feeling effects of the system. Specifically, torque and angle control of the front wheel is combined, in a weighted fashion, with angle control of the rear wheel, as detailed below. The collision avoidance system directed to (only) front wheel control is detailed in U.S. application Ser. No. 14/103,073, filed Dec. 11, 2013, which is also assigned to the assignee of the current application and is incorporated herein by reference in its entirety. This previous application details basic aspects and components of the model discussed below, some aspects of which are not repeated herein.

FIG. 1 is a process flow of a method of performing collision avoidance according to an embodiment of the invention. At block 110, generating a vehicle math model facilitates using model predictive control at block 130. As further detailed below, the vehicle math model includes a one-track linear bicycle model coupled with rear steer and a one degree-of-freedom (DOF) steering column model. Designing the steering control goal, at block 120, includes determining the relative weighting or tradeoff between the front and rear wheel steering control. The designed goal minimizes the path tracking error. At block 130, implementing the model predictive control (MPC) provides the control variables including front steering angle and torque overlay and rear steering angle. At block 140, sending control commands to the front and rear steering actuators represents implementation of the steering control according to the embodiments herein. Each of the processes is further detailed below.

Figure 2:
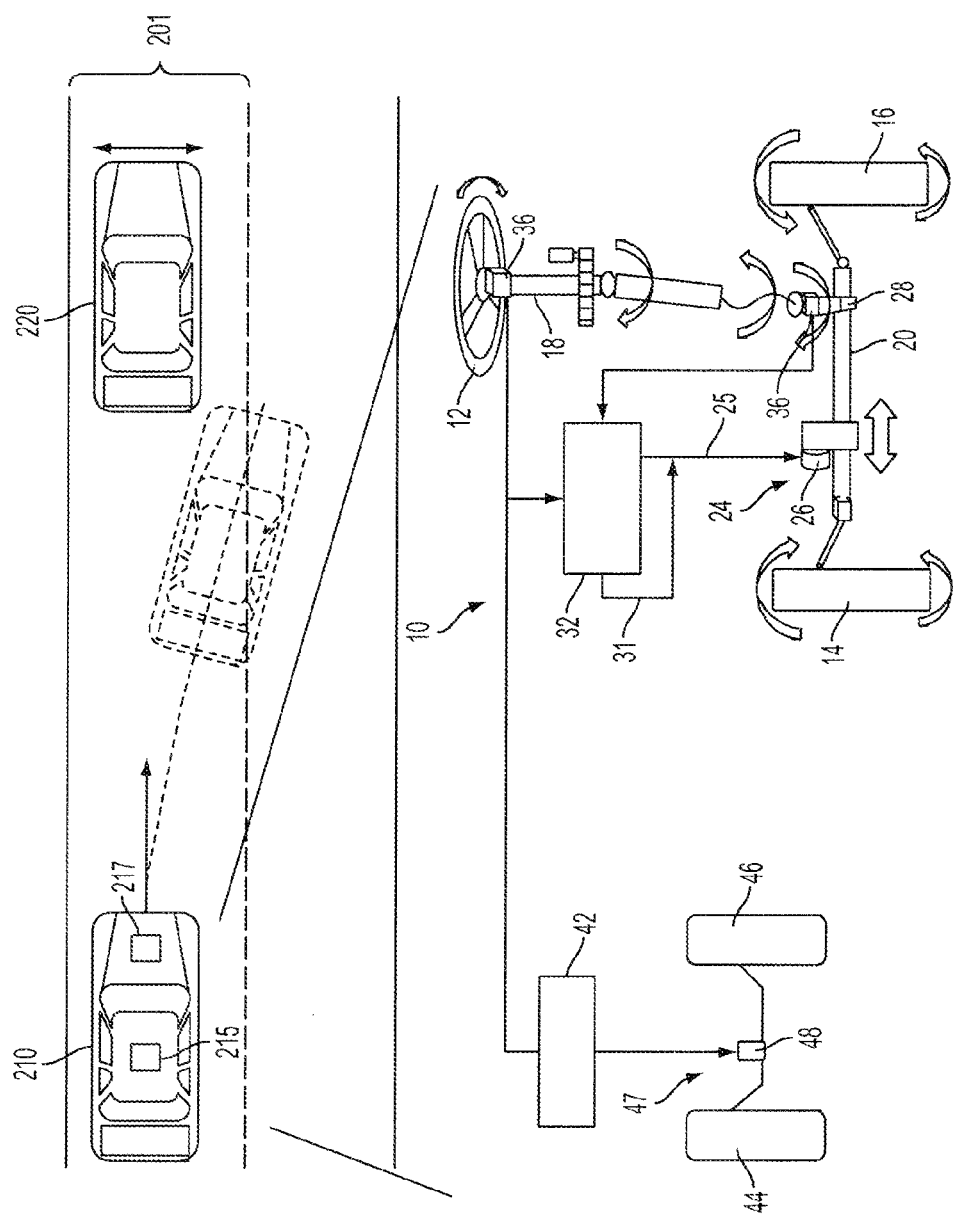
FIG. 2 illustrates an exemplary collision avoidance scenario according to an embodiment of the invention.

FIG. 2 illustrates an exemplary collision avoidance scenario according to an embodiment of the invention. A subject vehicle 210 (e.g., automobile) that includes one or more sensors 217, a central controller 215, and the steering system 10 is shown. As noted above, the sensors 217 may be a camera and imaging system, laser, lidar, radar, or some combination of one of more known sensor systems that indicate an obstacle (potential collision condition) to trigger action by the central controller 215. The central controller 215 includes one or more processors and one or more memory devices to store information including instructions for processing by the one or more processors. One of the applications or functions executed by the central controller 215 is collision avoidance according to the embodiments described herein. The instructions stored in the memory device of the central controller 215 include implementation of the MPC and may include instructions to develop a four-dimensional model (for steering angle overlay) or six-dimensional model (for torque overlay) employed by the MPC. In alternate embodiments, the models used by the MPC may be developed by another processing system within the vehicle or in communication with the vehicle. The processing circuitry of the central controller 215 may include an application specific integrated circuit (ASIC), an electronic circuit, a processor (shared, dedicated, or group) and memory that executes one or more software or firmware programs, a combinational logic circuit, and/or other suitable components that provide the described functionality. A target vehicle 220 is shown in the same lane 201 ahead of the subject vehicle 210 as an exemplary obstacle for the subject vehicle 210. Based on implementation of the MPC of the collision avoidance application of the central control system 215 (block 130, FIG. 1), as further detailed below, control commands are sent (block 140, FIG. 1) from the central controller 215 to the front and rear steering actuators 26, 48. As shown in FIG. 2, the collision avoidance function of the central controller 215, in conjunction with driver action, moves the subject vehicle 210 off the collision path in the exemplary scenario.

The exemplary steering system 10 is shown with the front wheels 14 and 16 and rear wheels 44 and 46. A steering wheel 12 is shown coupled to the wheels 14, 16 through a steering column 18 and the front axle 20 in a manner understood by those familiar with the art. That is, when the driver turns the steering wheel 12, the wheels 14, 16 turn accordingly. The steering system 10 includes an electric power steering (EPS) system 24 that includes an electric steering motor or front actuator 26 mounted to the front axle 20. A rear actuator 48 is similarly mounted to the rear axle (or rear wheel) and is part of the active rear steering (ARS) system 47 ( ). These actuators 26, 48 translate the driver steering commands (input by turning the steering wheel 12) to the wheels 14, 16, 44, 46. The steering system 10 also includes an EPS electronic control unit (ECU) 32 for the front EPS 24 and an ARS ECU 42 for the rear ARS 47 to provide overall control according to an embodiment. The actuators 26, 48 additionally facilitate implementation of collision avoidance by taking additional inputs originating at the collision avoidance application of the central controller 215. The EPS system 24 assists a driver in steering by applying a variable motor torque command $T_M$ 25 to the steering motor (front actuator 26). The EPS system 24 additionally applies a torque overlay command (TOC) 31 or front angle overlay command and the rear ARS 47 applies a rear angle overlay command that alter the value of $T_M$ 25 or steering angles during an emergency steering maneuver. A steering angle sensor 36 mounted to the steering column 18 measures rotation of the steering wheel 12 and the steering column 18 and provides a steering angle signal θs indicating the steering angle. Similarly, a torque sensor 38 mounted to the steering column 18 measures and provides a torque signal Ts indicating torque on the steering column 18.

The processes noted above relate to providing a TOC 31 to the front actuator 26 or, alternately, front steering angle to the front actuator 26 (steering motor) and a rear steering angle to the rear actuator 48 from the central controller 215 (to the respective EPS and ARS ECUs 32, 42) to automatically control vehicle steering as part of the collision avoidance functionality of the central controller 215. The central controller 215 implements MPC employing a four-dimensional vehicle steering model to determine rear and maybe additionally front steering angle overlay and a six-dimensional vehicle steering model to determine the TOC 31. A one-track bicycle model provides four of the dimensions ($\Delta y$, $\Delta \Psi$, $V_y$, r) and a one-degree of freedom steering column model provides the other two dimensions (steering wheel angle $\phi$ or pinion angle and steering wheel angle rotation rate $\dot{\phi}$ or pinion angle rate). These models are detailed in incorporated U.S. application Ser. No. 14/103,073 and the discussion regarding the models below focuses on differences in this application based on the combined control of front and rear wheel steering.

Figure 3:
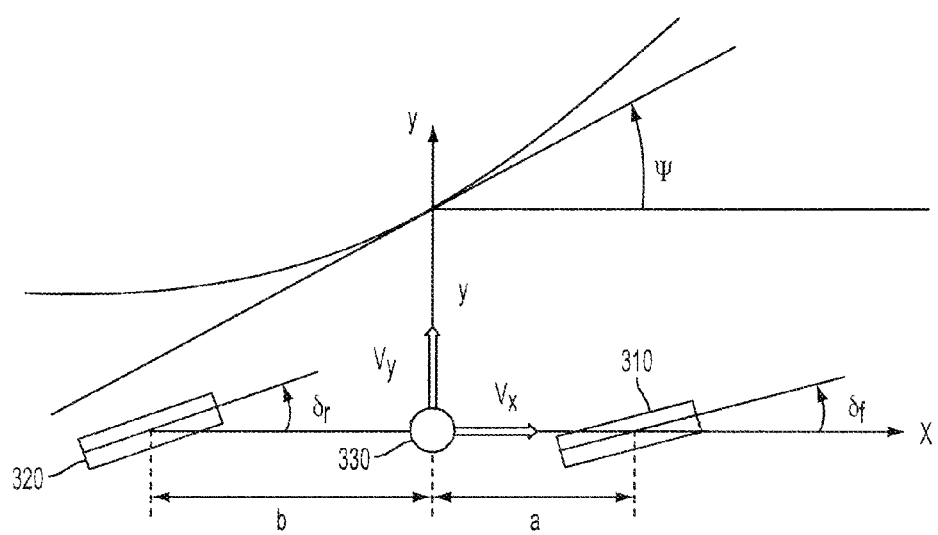
FIG. 3 illustrates a one-track linear bicycle model employed in accordance with embodiments of the invention.

FIG. 3 illustrates a one-track linear bicycle model employed in accordance with embodiments of the invention. The illustrated model indicates a front wheel 310, a rear wheel 320, and the vehicle center of gravity 330. The front wheel angle is given by $\delta_f$ and the rear wheel angle is given by $\delta r$. These angles are control variables. The distance from the front wheel 310 (front axle) to the vehicle center of gravity 330 is shown as a, and the distance from the rear wheel 320 (rear axle) to the vehicle center of gravity 330 is shown as b. The four-dimensional math model is given by a state vector:

$$x_{k+1} = A_d x_k + B_d u_k + h_k \quad [\text{EQ. 1}]$$

$h_k$ is a curvature term that can be thought of as a known disturbance. $A_d$ and $B_d$ (where d indicates discrete values) are matrices. $x_k$ is a state vector given by:

$$x_k = [\Delta y, \Delta \Psi, V_y, r]^T \quad [\text{EQ. 2}]$$

$\Delta y$ is the lateral offset of the vehicle center of gravity 330 (lane offset), $\Delta \Psi$ is the vehicle heading with respect to the lane 201 (lane heading), $V_y$ is vehicle lateral velocity, and r is the vehicle yaw rate. $u_k$ in EQ. 1 is a matrix given by:

$$u_k = [\delta_f, \delta_r] \quad [\text{EQ. 3}]$$

Unlike the system with only front wheel steering control, a rear wheel angle δr is part of the four-dimensional math model of EQ. 1, which is why the one-track linear bicycle model is said to be coupled with rear steer according to the embodiments herein.

Figure 4:
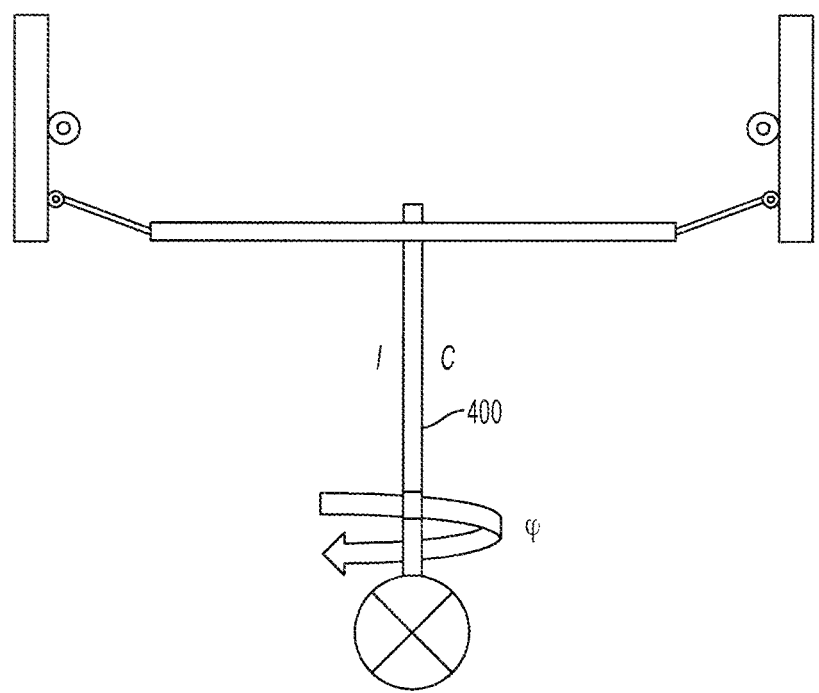
FIG. 4 illustrates a vehicle steering column used to define parameters for the one DOF steering column model according to embodiments of the invention.

FIG. 4 illustrates a vehicle steering column 400 used to define parameters for the one DOF steering column model according to embodiments of the invention. As noted above, the one DOF steering column model provides the other two dimensions for the six-dimensional model employed by the MPC. The continuous version of the equation describing the steering column dynamics is given by:

$$I\ddot{\phi} + c\dot{\phi} = M_{eps} + M_{self\text{-}align} + M_{HW} \qquad [\text{EQ. 4}]$$

I is the steering inertia, c is a damping coefficient, $M_{eps}$ is the total EPS torque, $M_{self\text{-}align}$ is the tire self-align torque, and $M_{HW}$ is the hand-wheel torque or the torque provided by the driver input. Based on the models discussed above the discretized six-dimensional math model is given by EQ. 1 with $$x_k = [\Delta y, \Delta \Psi, V_y, r, \dot{\phi}, \phi]^T \qquad [\text{EQ. 5}]$$

$x_k$ is the state vector, where $\Delta y$, $\Delta \Psi$ indicate the deviation between the current vehicle path and the desired vehicle path (deviation from the path is described by the lateral deviation $\Delta y$ and heading angle deviation $\Delta \Psi$). $u_k$ is a vector of the control variables and is given by:

$$u_k = [M_{eps}, \delta_r]^T \qquad [\text{EQ. 6}]$$

The EPS ECU 32 uses the control variables to determine the required amount of torque overlay on the front wheels and the ARS ECU 42 uses the control variables to determine the required angle for the rear wheels. To be clear, when the rear and front wheel steering angle is being provided by the collisional avoidance functionality, the four-dimensional state vector (EQ. 1) is used and the control vector given by EQ. 3 is used, and, when the front torque overlay is being provided with rear wheel steering angle, the six-dimensional state vector (EQ. 5) is used with EQ. 1 plus EQ. 4 where the control vector is given by EQ. 6.

Designing the steering control goal (process 120, FIG. 1) involves finding the control variables that minimize a cost function J, as detailed below J is a quadratic cost function which is the explicit formula for MPC control:

$$J = \int_0^{\Delta T} \left\{ [\Delta y \quad \Delta \psi]_{err} \cdot Q(t) \cdot \begin{bmatrix} \Delta y \\ \Delta \psi \end{bmatrix}_{err} + u \cdot R(t) \cdot u^T \right\} dt \to \min \qquad [\text{EQ. 7}]$$

$\Delta y_{err}$ is the lateral offset error ($\Delta y_{desired} - \Delta y_{predicted}$), $\Delta \Psi_{err}$ is the heading angle error ($\Delta \Psi_{desired} - \Delta \Psi_{predicted}$). Q(t) and R(t) are tuning parameters based on different front and rear actuators 26, 48. Minimizing path tracking error equates to minimizing the first term of EQ. 7, because the first term relates to tracking error and the second term relates to a limit on the control action. These parameters may be stored in the memory device of the collision avoidance system 24 in association with the type of actuators. For example, the rear steer control authority may be 2 degrees for a sedan and 10 degrees for a pickup truck. Q(t) is a weighting matrix for predicted errors given by:

$$Q = \begin{pmatrix} Q_{lateral} & 0 \\ 0 & Q_{heading} \end{pmatrix} \qquad [\text{EQ. 8}]$$

$Q_{lateral}$ is the weight associated with the lateral error (output) and $Q_{heading}$ is the weight associated with the heading error (output). R(t) is a weighting matrix for control moves given by:

$$R = \begin{pmatrix} R_{front} & 0 \\ 0 & R_{rear} \end{pmatrix} \qquad [\text{EQ. 9}]$$

$R_{front}$ is the weight associated with front steer (input to the controller) and $R_{rear}$ is the weight associated with the rear steer (input to the controller). Using MPC (block 130, FIG. 1) includes solving the optimization problem set up above (finding u to minimize J). Sending the control commands (block 140, FIG. 1) involves the collision avoidance system 215 sending the torque overlay or front angle commands to the motor 26 (front actuator) and the rear angle command to the rear actuator 48 from the central controller 215 to the respective EPS 24 and ARS 47.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of providing automatic collision avoidance in a vehicle with a front wheel electric power steering (EPS) system and rear wheel active rear steering (ARS) system, the method comprising:
generating, using a processor, a vehicle math model including control variables;
designing a steering control goal as a criterion to determine the control variables;
implementing a model predictive control to solve the steering control goal and determine the control variables; and
providing the control variables to the EPS system and the ARS system to respectively control a front actuator associated with front wheels and a rear actuator associated with rear wheels, wherein the generating the vehicle math model includes generating a six-dimensional model with a one-track bicycle model for four dimensions of the six-dimensional model and a one degree-of-freedom steering column model for two dimensions of the six-dimensional model.

2. The method according to claim 1, wherein the providing the control variables includes providing a torque overlay command to the EPS system.

3. The method according to claim 2, wherein the generating the vehicle math model includes generating the one-track bicycle model to include a rear wheel angle as one of the control variables and a one degree-of-freedom steering column model to include an amount of torque overlay on the front wheels as another one of the control variables.

4. The method according to claim 1, wherein the designing the steering control goal includes determining a relative weighting between front wheel control and rear wheel control.

5. The method according to claim 1, wherein the implementing the model predictive control includes solving the steering control goal to determine the control variables that minimize a cost function that includes tuning parameters.

6. The method according to claim 5, further comprising selecting the tuning parameters based on a type of the front actuator and the rear actuator associated with different types of vehicles.

7. An automatic collision avoidance system in a vehicle with a front wheel electric power steering (EPS) system and active rear steering (ARS) system, the system comprising:
a memory device configured to store parameters corresponding with different types of front and rear actuators associated with different types of vehicles; and
a processor configured to generate a vehicle math model including control variables, design a steering control goal as a criterion to determine the control variables, implement a model predictive control to solve the steering control goal and determine the control variables, and provide the control variables to the EPS system and the ARS system to respectively control a front actuator associated with front wheels and a rear actuator associated with rear wheels, wherein
the processor generates the vehicle math model as a six-dimensional model with a one-track bicycle model for four dimensions of the six-dimensional model and a one degree-of-freedom steering column model for two dimensions of the six-dimensional model, and
the processor selects tuning parameters among the stored parameters in the memory device corresponding with the front actuator and the rear actuator of the type of the vehicle to design and to solve the steering control goal.

8. The system according to claim 7, wherein the processor provides the control variables associated with torque overlay to the EPS system.

9. The system according to claim 8, wherein the processor generates the one-track bicycle model to include a rear wheel angle as one of the control variables and the one degree-of-freedom steering column model to include an amount of torque overlay on front wheels as another one of the control variables.

10. The system according to claim 7, wherein the processor designs and solves the steering control goal to determine a relative weighting between front wheel control and rear wheel control in the control variables.

11. The system according to claim 7, wherein the processor solves the steering control goal to determine the control variables that minimize a cost function that includes the tuning parameters.

12. The system according to claim 7, wherein the vehicle is an automobile.

13. The system according to claim 7, wherein the vehicle is a robot.

14. The system according to claim 7, wherein the vehicle is a construction vehicle.

* * * * *